Dec. 6, 1960
L. BARON
2,963,694
SPEED ALARM FOR VEHICLES
Filed March 3, 1959
3 Sheets-Sheet 1
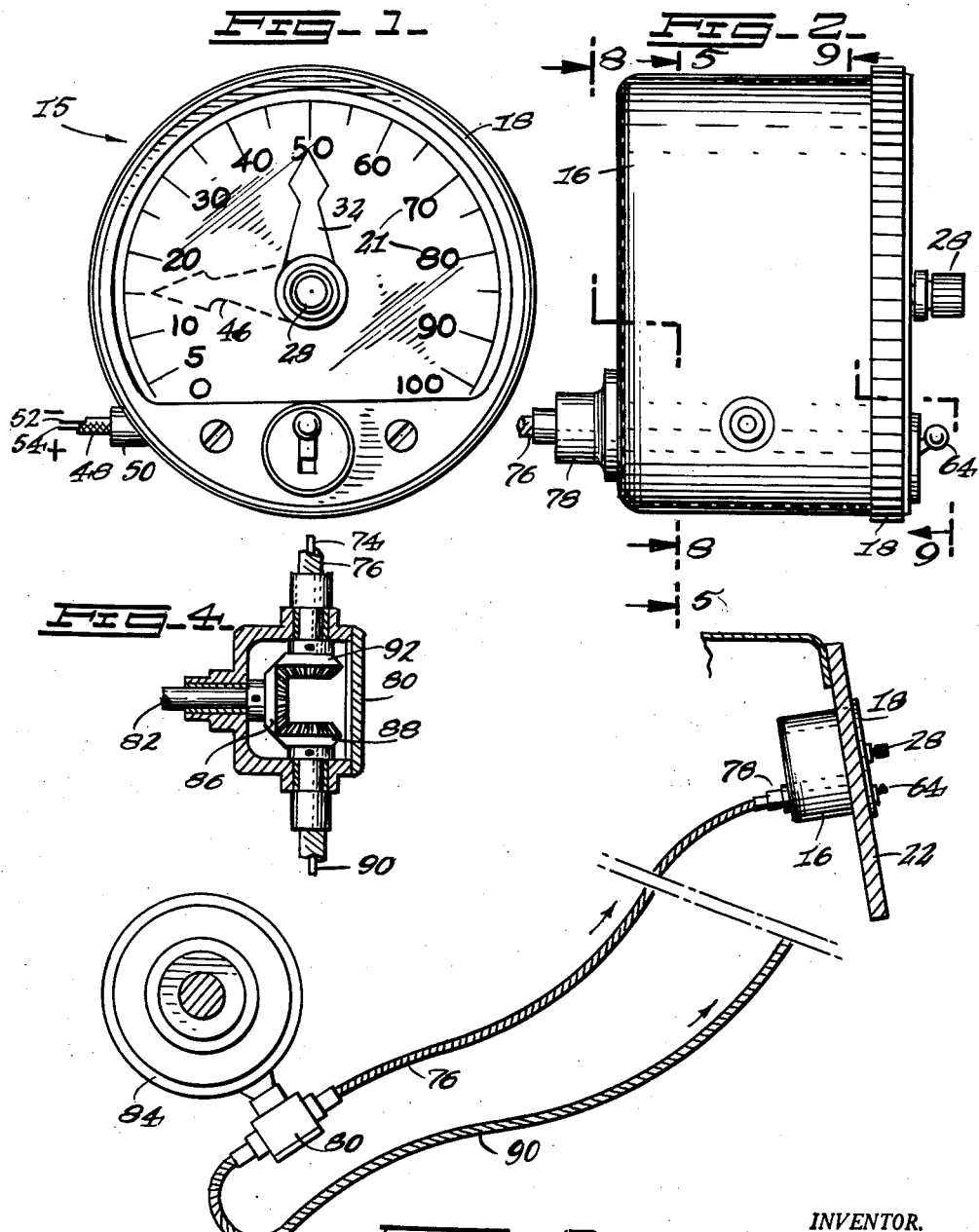
INVENTOR.
LOU BARON
BY J. Ledermann
ATTORNEY.

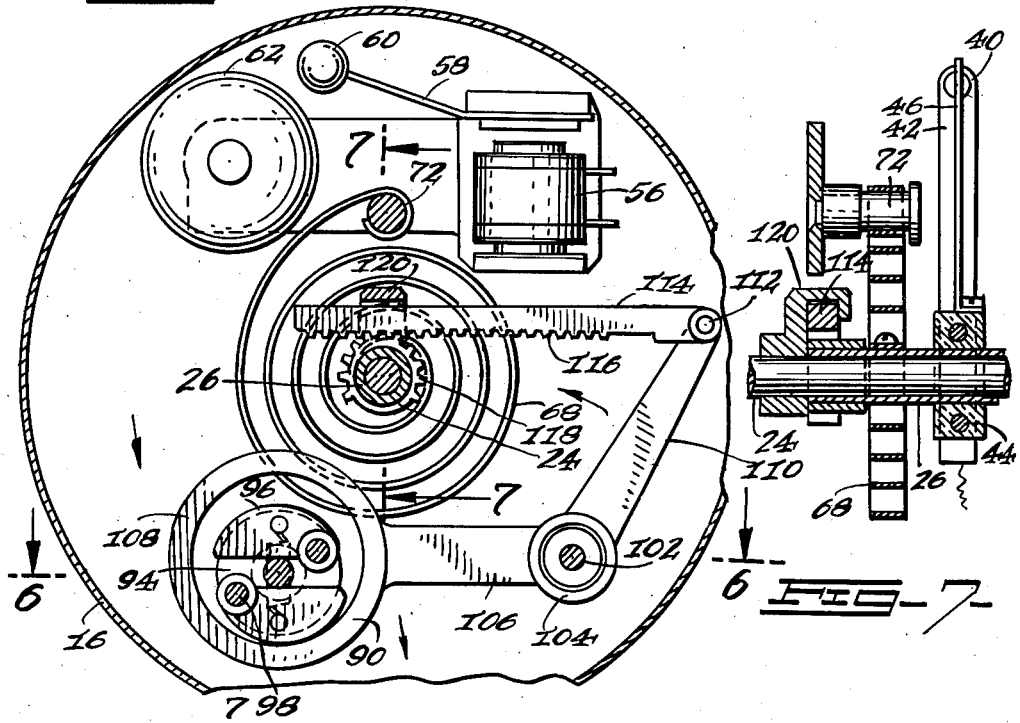
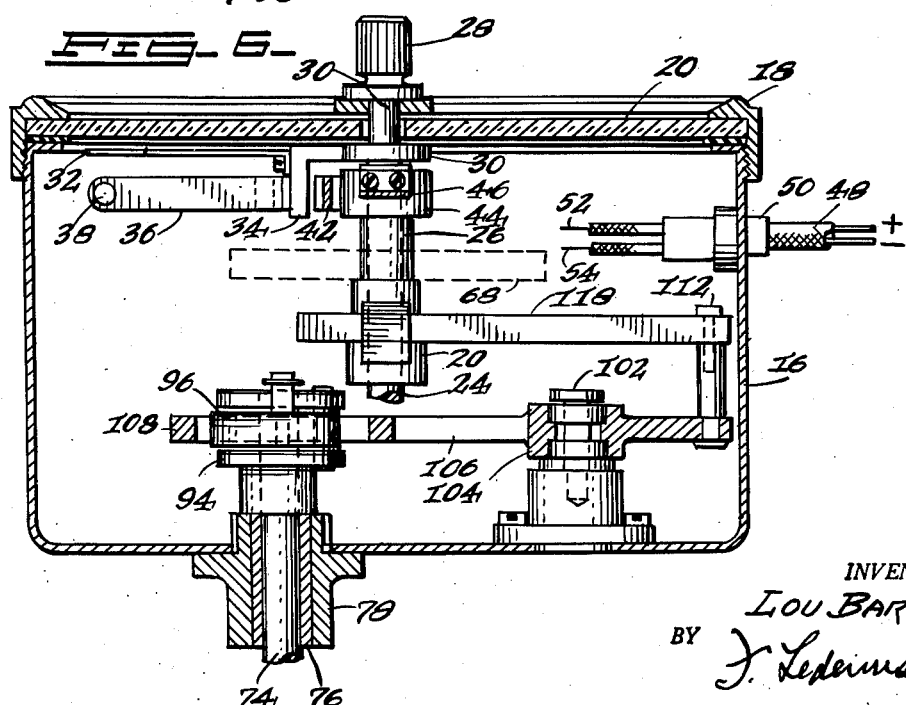

Dec. 6, 1960
L. BARON
2,963,694
SPEED ALARM FOR VEHICLES
Filed March 3, 1959
3 Sheets-Sheet 3
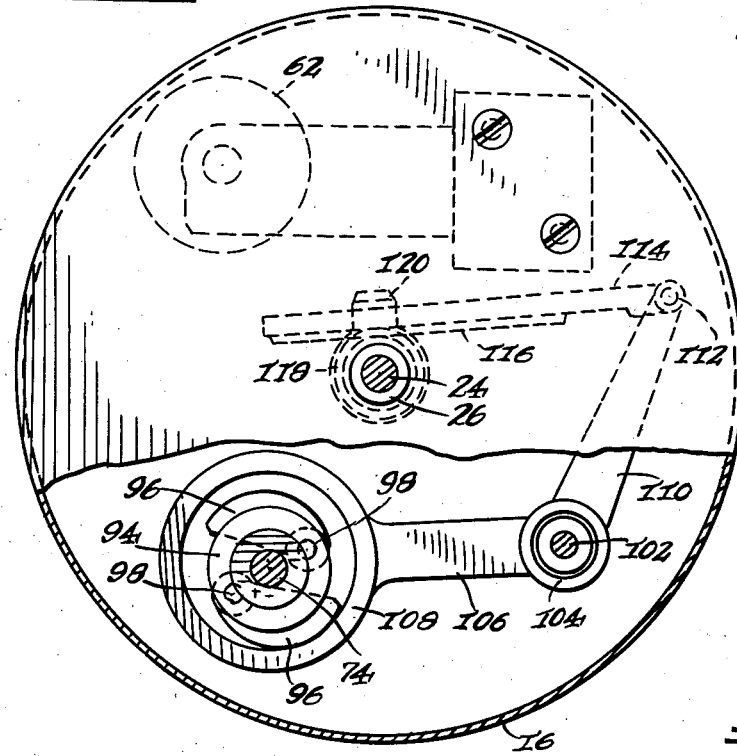
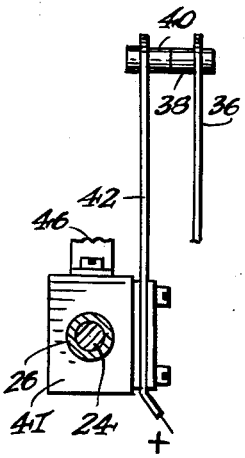
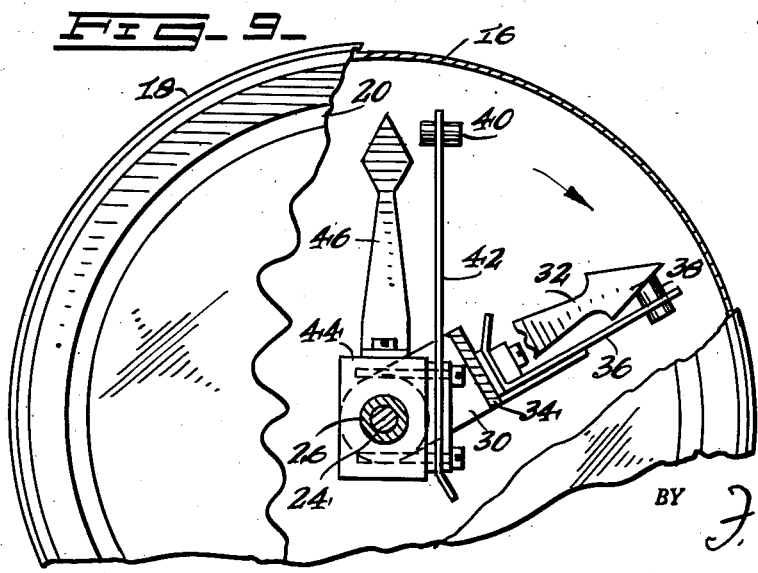
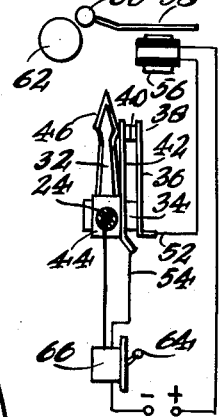
INVENTOR.
LOU BARON
BY F. Ledermann
ATTORNEY.

United States Patent Office 2,963,694
Patented Dec. 6, 1960

2,963,694

SPEED ALARM FOR VEHICLES

Lou Baron, 55 Pineapple St., Brooklyn, N.Y.

Filed Mar. 3, 1959, Ser. No. 796,894

2 Claims. (Cl. 340—263)

This invention relates to automotive vehicles and, more particularly, to an accessory therefor.

Ordinarily, it is necessary for the driver of a vehicle to frequently glance at the speedometer in order to determine the velocity of the vehicle, and to ensure against speeding in restricted speed zones. This is not only fatiguing, but is also dangerous in that the driver must momentarily lose sight of the road, during which interval an emergency can arise over which the driver will have no control. It is therefore an object of the present invention to provide an audible alarm for automotive vehicles that will automatically warn the driver that a predetermined speed has been exceeded, so as to overcome the aforementioned difficulties.

Still another object of the present invention is to provide a speed alarm for automotive vehicles that can be manually set at any desired speed, which will automatically warn the driver that the vehicle has attained such speed during travel.

A further object of the present invention is to provide a speed alarm accessory for automotive vehicles that is completely separate from the speedometer of the vehicle, so that both instruments may be checked in order to determine the accuracy thereof.

An additional object of the present invention is to provide a speed alarm device for automotive vehicles that can also be used as a speedometer to determine the velocity of the vehicle at any point below the predetermined setting thereof.

A more specific object of the present invention is to provide a manually controllable speed alarm device for automotive vehicles that can be readily included in all new production models, but which may also be readily installed on existing automotive vehicles in a simple and efficient manner, and at a relatively low cost.

All of the foregoing and still further objects and advantages of this invention will become apparent from a study of the following specification, taken in connection with the accompanying drawing, wherein:

Figure 1 is a front plan view of a speed alarm device made in accordance with the present invention;

Figure 2 is a side elevational view of the device shown in Figure 1;

Figure 3 is a diagrammatic view illustrating the manner in which the device is installed in an automotive vehicle;

Figure 4 is an enlarged longitudinal sectional view of a drive assembly for simultaneously driving the vehicle speedometer and the speed alarm device made in accordance with the present invention, from the transmission unit of the vehicle;

Figure 5 is an enlarged transverse sectional view taken along line 5—5 of Figure 2;

Figure 6 is a transverse sectional view taken along line 6—6 of Figure 5;

Figure 7 is a fragmentary cross sectional view taken along line 7—7 of Figure 5;

Figure 8 is a cross sectional view taken along line 8—8 of Figure 2;

Figure 9 is a cross sectional view taken along line 9—9 of Figure 2;

Figure 10 is a fragmentary view similar to Figure 9, showing certain contact elements in a circuit closed position; and Figure 11 is a schematic wiring diagram of the electrical circuit of the speed alarm device of the present invention.

Referring now to the drawing, a speed alarm mechanism 15 for automotive vehicles made in accordance with the present invention is shown to include a main housing 16 having a bezel 18 upon the front side thereof that secures a transparent dial plate 20 within the front end of the housing and serves to secure the unit within the dashboard 22 of the vehicle.

A main shaft 24 extends concentrically through the housing 16 and an opening 30 in the dial plate 20 in concentric relationship with numerical indicia 21 on the dial plate that corresponds to similar numerical indicia upon the face of the vehicle speedometer (not shown). A sleeve 26 is rotatably supported upon a mid portion of the main shaft 24 for rotation independently thereof. A knob 28 secured to the outer front end of the shaft 24 may be manually rotated to selectively rotate the main shaft 24 and a pointer 32 carried upon a fixed bearing 30 secured to the shaft 24 on the inside of the dial plate 20, as is more clearly shown in Figures 6 and 9. A rearwardly offset web 34 serves as a mounting for a radially outwardly extending flexible plate 36 having an electrical contact 38 carried upon the outer end thereof. This contact 38 is engaged by a similar contact 40 carried upon the outer end of a flexible strip 42 secured to the mounting block 44 upon which a second pointer or indicator 46 is fastened. This mounting block 44 is fixed to the sleeve 26 for rotation therewith relative to the shaft 24. It will now be recognized that by manually setting the first indicator 32 relative to the numerical indicia 21 on the dial plate 20, movement of the second indicator 46 by a drive mechanism hereinafter described that is responsive to the forward motion of the vehicle, is operative to effect a closing of the contacts 38, 40, each one of which is connected to a lead 52, 54 of an electrical supply cable 48 entering the housing through a coupling 50 from a suitable source of electrical energy, such as from the storage battery of the vehicle. An electromagnetic signal device 56, such as a bell or buzzer, is connected in series with the contacts 38, 40 and the source of electrical energy, whereupon the closing of the contacts 38, 40 is operative to energize this element to effect reciprocating movement of the armature 58 and striker 60 relative to a bell plate 62, thus emitting an audible signal that will be recognized by the driver of the vehicle as a warning that the predetermined speed, as selected by the manually rotatable indicator 32 has been exceeded. Another switch 66 connected in series relationship with the electrical elements and having an outwardly extending toggle 64, may be manually opened or closed to selectively connect or disconnect the signal device whenever desired.

A convoluted torsion spring 68, having one outer end secured to a fixed mounting 72 of the housing, has the inner end thereof secured to the sleeve 26 so as to normally yieldably urge the second indicator 46 and associated contacts toward the initial zero velocity position. A drive mechanism, hereinafter more fully described, acts between the sleeve 26 and the input end of a flexible shaft 74 to drive the indicator 46 and associated contacts mounted upon the sleeve 26 in response to forward movement of the vehicle. The flexible shaft 74, enclosed within a casing 76, extends into a coupling 78 in the rear of the main housing 16. The opposite end of this shaft 74 extends into an auxiliary housing 80 and has a bevel gear 92 secured thereto. This bevel gear 92 is driven by a similar bevel gear 86 mounted upon the inner end of a flexible drive shaft 82 that has its opposite end in driven relationship with the vehicle transmission unit 84. The drive bevel gear 86 is also in meshing engagement with another bevel gear 88 that is substantially identical to the driven bevel gear 92, and which drives the vehicle speedometer through an associated flexible cable assembly 90. Thus, the flexible shafts of both the speedometer and speed signal unit are driven at substantially identical speeds from the same point of connection to the vehicle transmission unit.

The inner end of the flexible drive shaft 74 has a centrifugal type governor supported thereon, which governor 94 has a pair of eccentrically mounted masses or weights 96 pivotally secured by means of pins 98 at diametrically opposite sides of the shaft. A tension spring 100, as is more clearly shown in Figure 5 of the drawing, normally urges these two segments 96 toward each other, but is yieldable to enable such segments 96 to move radially outwardly, in the manner shown in Figure 8 of the drawing, in response to rotation of the drive shaft 74 in response to the forward movement of the vehicle. A pivot pin assembly 102 carried by the main housing 16 rotatably supports the central hub 104 of a bell crank lever that has one leg 106 which terminates in an annular frame 108 that encircles the governor 94. The other leg 110 of the bell crank lever has a pivotal connection 112 at its outermost end, to which one end of a rack gear 114 is hingedly connected. This rack gear 114 has teeth 116 in meshing engagement with corresponding teeth in a pinion 118 secured upon the sleeve 26. An inverted U-shaped guide 120 rotatably carried upon the main shaft 24 overlies the rack gear 114 and maintains it is meshing engagement with the pinion 118 in all positions of use.

The operation of this device will now be more readily understood. With the toggle switch 16 in the circuit closed position, the speed alarm is ready to be used. The driver of the vehicle may manually set the first indicator 32 to the legal speed limit, or at any desired maximum speed at which the driver wishes to travel, simply by rotating the knob 28. Such indicator 32 will then remain in such position during travel of the vehicle, until later changed by the driver. Forward motion of the vehicle effects rotation of the flexible shaft 74 at substantially the same rate of speed as the drive shaft of the speedometer. Such rotation of the shaft 74 drives the governor 94, so as to cause the segments 96 to move outwardly by centrifugal force. Since the torsion spring 68 urges the bell crank lever in a clockwise direction, as viewed in Figures 5 and 8 of the drawing, the lower side of the annular frame 108 is urged into engagement with the lower side of the governor 94. Thus, as the governor rotates, only a downward force is transmitted to the lowermost part of the frame 108, since the frame is large enough so that the upper portion thereof remains clear of the segments at all times. The downward movement of the frame 108 is thus transmitted as an axial force to the rack gear 114, to rotate the pinion 118 that is secured to the sleeve 26. Since the second indicator 46 is carried by this sleeve 26, it will be rotated in proportion to the velocity of the vehicle, in a direction toward the first indicator 32. When the vehicle has attained the predetermined speed designated by the first indicator 32, the contacts 38, 40, will close, thus closing the electrical circuit through the buzzer or bell, in the manner hereinbefore described, thus providing an audible signal to the driver. Thereafter, no matter how fast the vehicle travels, both indicators 32, 46, will not pass beyond the setting of the manually adjustable indicator 32, and the signal will be continuously energized until either the device is reset by rotation of the knob 28, the toggle switch 66 is opened, or the driver slows the vehicle to a point below the predetermined setting.

While this invention has been described with particular reference to the construction shown in the drawing, it is to be understood that such is not to be construed as imparting limitations upon the invention, which is best defined by the claims appended hereto.

Having thus described my invention, I claim as new and desire to secure by Letters Patent:

1. A vehicle speed responsive device including a housing having a drive shaft rotatably mounted therein adapted to be rotated by, and proportionately to, the forward speed of the vehicle, a second shaft rotatably mounted in the housing above said drive shaft and having a sleeve rotatably mounted thereon, said sleeve having at least a portion thereof provided with circumferential teeth to form a pinion, a coiled spring surrounding said second shaft having one end anchored to the housing and having the other end secured to the sleeve normally urging the sleeve to rotate in one direction, a bell crank pivoted to the housing below and to one side of said second shaft, one arm of the bell crank extending upward and having a rack pivoted thereto, said rack meshing with said pinion, means on said sleeve constraining the rack to mesh with the pinion, the other arm of the bell crank extending approximately horizontally under said second shaft and having a circular frame on the end thereof, a governor on said drive shaft including diametrically opposed excentrically pivoted weights and resilient means normally urging the weights to swing toward the axis of the governor, said frame lying in the plane of and encircling said weights, said pinion normally urging said rack tangentially outward from the sleeve whence said frame is normally urged upward toward said weights, an increase in the speed of the drive shaft causing said weights to swing outward from said axis to push said frame downward and hence move said rack in the opposite direction to rotate said sleeve in a direction opposite said normal direction of rotation thereof, the housing having a graduated dial on the outside thereof, an indicator needle on said sleeve positioned adjacent the dial to indicate the speed of the vehicle, said second shaft having a manually movable indicator needle thereon positioned outside the housing, said second shaft having a rigid arm thereon inside the housing parallel with said manually movable indicator needle, said sleeve having a rigid arm thereon inside the housing parallel with said first-named indicator needle, said two last-named arms having contacts thereon adapted to be mutually engaged to close a circuit when said first-named indicator needle reaches the position of said manually movable needle.

2. A device according to claim 1, said constraining means on said sleeve comprising an inverted U-shaped extension on the sleeve having said rack slidably mounted therein.

References Cited in the file of this patent

UNITED STATES PATENTS

| | | |
|---|---|---|
| 2,813,264 | Wargo | Nov. 12, 1957 |
| 2,866,022 | Minniberg | Dec. 23, 1958 |